(12) United States Patent
Zhao

(10) Patent No.: US 11,456,889 B2
(45) Date of Patent: Sep. 27, 2022

(54) INFORMATION NOTIFICATION METHOD, APPARATUS, AND SYSTEM

(71) Applicant: BOE TECHNOLOGY GROUP CO., LTD., Beijing (CN)

(72) Inventor: Junjie Zhao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 16/464,240

(22) PCT Filed: Nov. 22, 2017

(86) PCT No.: PCT/CN2017/112329
§ 371 (c)(1),
(2) Date: May 24, 2019

(87) PCT Pub. No.: WO2018/095325
PCT Pub. Date: May 31, 2018

(65) Prior Publication Data
US 2019/0394062 A1    Dec. 26, 2019

(30) Foreign Application Priority Data
Nov. 25, 2016 (CN) .......................... 201611055884.6

(51) Int. Cl.
*H04L 12/28* (2006.01)

(52) U.S. Cl.
CPC ...... *H04L 12/2825* (2013.01); *H04L 12/2834* (2013.01)

(58) Field of Classification Search
CPC .................. H04L 12/2825; H04L 12/2834
See application file for complete search history.

(56) References Cited

U.S. PATENT DOCUMENTS

| 10,231,107 | B2 | 3/2019 | Wu | |
|---|---|---|---|---|
| 2014/0153554 | A1 | 6/2014 | He et al. | |
| 2015/0012551 | A1* | 1/2015 | Dong | G06F 16/245 707/755 |
| 2016/0088420 | A1* | 3/2016 | Kim | H04W 28/16 370/328 |

(Continued)

FOREIGN PATENT DOCUMENTS

| CN | 102932925 A | 2/2013 |
|---|---|---|
| CN | 103617705 A | 3/2014 |

(Continued)

OTHER PUBLICATIONS

Search Report issued in corresponding International Patent Application No. PCT/CN2017/112329, dated Feb. 11, 2018.

(Continued)

*Primary Examiner* — Glenton B Burgess
*Assistant Examiner* — Patrick F Ngankam
(74) *Attorney, Agent, or Firm* — McDermott Will & Emery LLP

(57) ABSTRACT

The present application discloses an information notification method and apparatus. The method is used for a first entity, and includes: determining a first resource feature; determining whether a structure of resources satisfies the first resource feature; and transmitting a notification message to a second entity if the structure of the resources satisfies the first resource feature.

13 Claims, 12 Drawing Sheets

(56) References Cited

U.S. PATENT DOCUMENTS

| | | |
|---|---|---|
| 2016/0191295 A1 | 6/2016 | Dong et al. |
| 2016/0269374 A1 | 9/2016 | Smith |
| 2016/0366028 A1* | 12/2016 | Yin .......................... H04L 9/40 |
| 2017/0134523 A1 | 5/2017 | Wu |
| 2018/0270324 A1 | 9/2018 | Yang |

FOREIGN PATENT DOCUMENTS

| | | |
|---|---|---|
| CN | 105791339 | * 12/2014 |
| CN | 104539656 A | 4/2015 |
| CN | 105282118 A | 1/2016 |
| CN | 105578444 A | 5/2016 |
| CN | 105763380 A | 7/2016 |
| CN | 105791339 A | 7/2016 |
| WO | 2015188440 A1 | 12/2015 |
| WO | 2016044718 A1 | 3/2016 |
| WO | WO-2016044718 A1 * | 3/2016 ............. H04L 67/34 |

OTHER PUBLICATIONS

Office Action issued in Chinese Patent Application No. 201611055884.6, dated Mar. 25, 2020.

Office Action issued in European Patent Application No. 17875000.6, dated Jun. 4, 2020.

* cited by examiner

INFORMATION NOTIFICATION METHOD, APPARATUS, AND SYSTEM

CROSS REFERENCE

This application is the U.S. National Phase under 35 US.C. § 371 of International Application No. PCT/CN2017/112329, filed on Nov. 22, 2017, which claims priority to the Chinese Patent Application No. CN201611055884.6, filed on Nov. 25, 2016, which are incorporated herein by reference in their entireties.

TECHNICAL FIELD

The present application relates to the field of Internet of Things technology, and more particularly, to an information notification method, apparatus, and system.

BACKGROUND

With the development of Internet of Things technology, various Internet of Things devices may access an Internet of Things management device through various network protocols. The Internet of Things management device uses resources to represent the Internet of Things devices, and may realize control of the Internet of Things devices by operating the resources of the Internet of Things devices.

In the related art, a smart home device is connected to the Internet of Things management device through a gateway, and a mobile phone may acquire a resource of the smart home device through the Internet of Things management device, so as to acquire information of the smart home device. In addition, the mobile phone may also transmit a subscription message to the Internet of Things management device, so that the Internet of Things management device may create a subscribed resource on the resource of the smart home device according to the subscription message, that is, the mobile phone may subscribe to the information of the smart home device through the Internet of Things management device. The Internet of Things management device automatically transmits a notification message to the mobile phone when the information of the smart home device changes.

In the related art, the mobile phone needs to transmit the subscription message to the Internet of Things management device to subscribe to the information of the smart home device. Therefore, if the mobile phone needs to subscribe to information of multiple devices, the mobile phone needs to transmit multiple subscription messages to the Internet of Things management device, which results in cumbersome information notification steps and inefficient information notification.

SUMMARY

The present application provides an information notification method, apparatus and system.

According to a first aspect of the embodiments of the present application, there is provided an information notification method for a first entity, the method comprising:

determining a first resource feature;

determining whether a structure of resources satisfies the first resource feature; and transmitting a notification message to a second entity if the structure of the resources satisfies the first resource feature.

In an example, the first resource feature is at least one resource structure, and determining whether a structure of resources satisfies the first resource feature comprises:

determining whether the structure of the resources satisfies any of the at least one resource structure.

In an example, the first resource feature is at least one resource structure described by at least one semantic descriptor, and determining whether a structure of resources satisfies the first resource feature comprises:

determining whether the structure of the resources satisfies any of the at least one resource structure.

In an example, the first resource feature is at least one index which points to at least one resource structure, and determining whether a structure of resources satisfies the first resource feature comprises:

determining whether the structure of the resources satisfies any of the at least one resource structure.

In an example, the first resource feature is at least one index, which points to at least one resource structure described by at least one resource descriptor, and determining whether a structure of resources satisfies the first resource feature comprises:

determining whether the structure of the resources satisfies any of the at least one resource structure.

In an example, before determining the first resource feature, the method further comprises:

creating a first subscribed resource which comprises information for indicating the first resource feature; and determining a first resource feature comprises:

determining the first resource feature according to the first subscribed resource.

In an example, the first resource feature is at least one resource structure, and the information for indicating the first resource feature contained in the first subscribed resource is a list of structures comprising the at least one resource structure.

In an example, the first resource feature is at least one resource structure described by at least one semantic descriptor, and the information for indicating the first resource feature contained in the first subscribed resource is a list of descriptors comprising the at least one semantic descriptor.

In an example, the first resource feature is at least one index, which points to at least one resource structure, and the information for indicating the first resource feature contained in the first subscribed resource is a list of indexes comprising the at least one index.

In an example, the first resource feature is at least one index, which points to at least one resource structure described by at least one resource descriptor, and the information for indicating the first resource feature contained in the first subscribed resource is a list of indexes comprising the at least one index.

In an example, after creating the first subscribed resource, the method further comprises:

setting an enabling attribute of the first subscribed resource to be true.

In an example, before determining whether the structure of the resources satisfies the first resource feature, the method further comprises:

receiving a resource operation request transmitted by a third entity, wherein the resource operation request comprises a resource acquisition request, a resource update request, a resource notification request, a resource discovery request, or a resource deletion request; or receiving a resource creation request transmitted by the third entity and creating resources.

In an example, before transmitting the notification message to the second entity, the method further comprises:

creating a second subscribed resource in the resources if the structure of the resources satisfies a reference resource feature; and transmitting the notification message to the second entity comprises: transmitting the notification message to the second entity according to the second subscribed resource.

In an example, after transmitting the notification message to the second entity, the method further comprises:

creating a second subscribed resource in the resources; and transmitting a notification message to the second entity according to the second subscribed resource when the resources are changed.

In an example, the structure of the resources comprises a resource relationship and a resource type.

In an example, before creating the first subscribed resource, the method further comprises:

receiving a creation request transmitted by the second entity; and creating the first subscribed resource comprises:

creating the first subscribed resource according to the creation request.

According to a second aspect of the embodiments of the present application, there is provided an information notification method for a second entity, the method comprising:

transmitting a creation request to a first entity, so that the first entity creates a first subscribed resource according to the creation request, determines a first resource feature according to the first subscribed resource, and determines whether a structure of resources satisfies the first a resource feature; and receiving a notification message transmitted by the first entity when determining that the resources have the first resource feature.

According to a third aspect of the embodiments of the present application, there is provided an information notification apparatus for a first entity, the information notification apparatus comprising:

a determination unit configured to determine a first resource feature;

a judgment unit configured to determine whether a structure of resources satisfies the first resource feature; and a first transmission unit configured to transmit a notification message to a second entity when the structure of the resources satisfies the first resource feature.

In an example, the first resource feature is at least one resource structure, and the judgment unit is further configured to:

determine whether the structure of the resources satisfies any of the at least one resource structure.

In an example, the first resource feature is at least one resource structure described by at least one semantic descriptor, and the judgment unit is further configured to:

determine whether the structure of the resources satisfies any of the at least one resource structure.

In an example, the first resource feature is at least one index which points to at least one resource structure, and the judgment unit is further configured to:

determine whether the structure of the resources satisfies any of the at least one resource structure.

In an example, the first resource feature is at least one index, which points to at least one resource structure described by at least one resource descriptor, and the judgment unit is further configured to:

determine whether the structure of the resources satisfies any of the at least one resource structure.

In an example, the information notification apparatus further comprises:

a first creation unit configured to create a first subscribed resource which comprises information for indicating the first resource feature, and the determination unit is further configured to:

determine the first resource feature according to the first subscribed resource.

In an example, the first resource feature is at least one resource structure, and the information for indicating the first resource feature contained in the first subscribed resource is a list of structures comprising the at least one resource structure.

In an example, the first resource feature is at least one resource structure described by at least one semantic descriptor, and the information for indicating the first resource feature contained in the first subscribed resource is a list of descriptors comprising the at least one semantic descriptor.

In an example, the first resource feature is at least one index, which points to at least one resource structure, and the information for indicating the first resource feature contained in the first subscribed resource is a list of indexes comprising the at least one index.

In an example, the first resource feature is at least one index, which points to at least one resource structure described by at least one resource descriptor, and the information for indicating the first resource feature contained in the first subscribed resource is a list of indexes comprising the at least one index.

In an example, the information notification apparatus further comprises:

a setting unit configured to set an enabling attribute of the first subscribed resource to be true.

In an example, the information notification apparatus further comprises:

a first receiving unit configured to receive a resource operation request transmitted by a third entity, wherein the resource operation request comprises a resource acquisition request, a resource update request, a resource notification request, a resource discovery request, or a resource deletion request; or a second receiving unit configured to receive a resource creation request transmitted by the third entity and create resources.

In an example, the information notification apparatus further comprises:

a second creation unit configured to create a second subscribed resource in the resources when the structure of the resources satisfies a reference resource feature, and the first transmission unit is further configured to transmit the notification message to the second entity according to the second subscribed resource.

In an example, the information notification apparatus further comprises:

a third creation unit configured to create a second subscribed resource in the resources; and a second transmission unit configured to transmit a notification message to the second entity according to the second subscribed resource when the resources are changed.

In an example, the structure of the resources comprises a resource relationship and a resource type.

In an example, the information notification apparatus further comprises:

a third receiving unit configured to receive a creation request transmitted by the second entity, and the first creation unit is further configured to create the first subscribed resource according to the creation request.

According to a fourth aspect of the embodiments of the present application, there is provided an information notification apparatus for a second entity, the information notification apparatus comprising:

a transmission unit configured to transmit a creation request to a first entity, so that the first entity creates a first subscribed resource according to the creation request, determines a first resource feature according to the first subscribed resource, and determines whether a structure of resources satisfies the first a resource feature; and a receiving unit configured to receive a notification message transmitted by the first entity when determining that the resources have the first resource feature.

According to a fifth aspect of the embodiments of the present application, there is provided an information notification system, comprising a first entity, a second entity, and a third entity, wherein the first entity comprises the information notification apparatus according to the first aspect, and the second entity comprises the information notification apparatus according to the second aspect.

In an example, the first entity is a Common Service Entity (CSE), the second entity is an Application Entity (AE) or a CSE, and the third entity is an AE or a CSE.

BRIEF DESCRIPTION OF THE ACCOMPANYING DRAWINGS

FIG. 1-2 is a flowchart of an information notification method in the related art;

FIG. 2 is a flowchart of an information notification method according to an embodiment of the present application;

The embodiments of the present application have been illustrated by the above-described accompanying drawings, and will be described in more detail hereinafter. These accompanying drawings and the literal description are not intended to limit the scope of the concept of the present application in any way, and the concept of the present application will be described for those skilled in the art with reference to specific embodiments.

DETAILED DESCRIPTION

In order to make the purposes, technical solutions and advantages of the present application more clear, the embodiments of the present application will be further described in detail below with reference to the accompanying drawings. It is apparent that the embodiments described are only a part of the embodiments of the present application, instead of all the embodiments.

Figure 1:
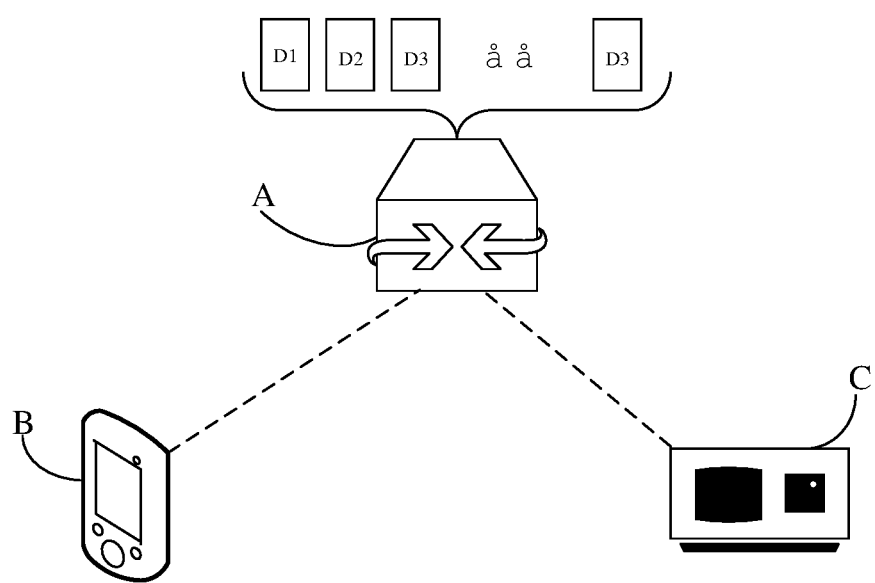
FIG. 1-1 is a schematic diagram of an information notification scenario according to an embodiment of the present application.

FIG. 1-1 is a schematic diagram of an information notification scenario according to an embodiment of the present application. As shown in FIG. 1-1, a second entity B and a third entity C each establish a communication connection with a first entity A. Specifically, the second entity B, the first entity A, and the third entity C may be connected to each other through a wired network or a wireless network, wherein the wired network may comprise, but not limited to, a Universal Serial Bus (USB), and the wireless network may comprise, but not limited to, Wireless Fidelity (WIFI), Bluetooth, Infrared, Zigbee, etc.

The second entity B and the third entity C may perform information interaction with the first entity A. For example, the second entity B may transmit information to the first entity A, and the third entity C may also transmit information to the first entity A. The first entity A may store the received information. For example, the first entity A may manage at least two resources D, and the resources D comprise a resource D1 having the information transmitted by the second entity B, and a resource D2 having the information transmitted by the third entity C. The resources D may further comprise a resource D3 having information transmitted by another entity.

For example, the second entity B may be an Application Entity (AE) or a Common Service Entity (CSE), the third entity C may also comprise an AE or a CSE, and the first entity A may comprise a CSE.

Figures 1, 2:
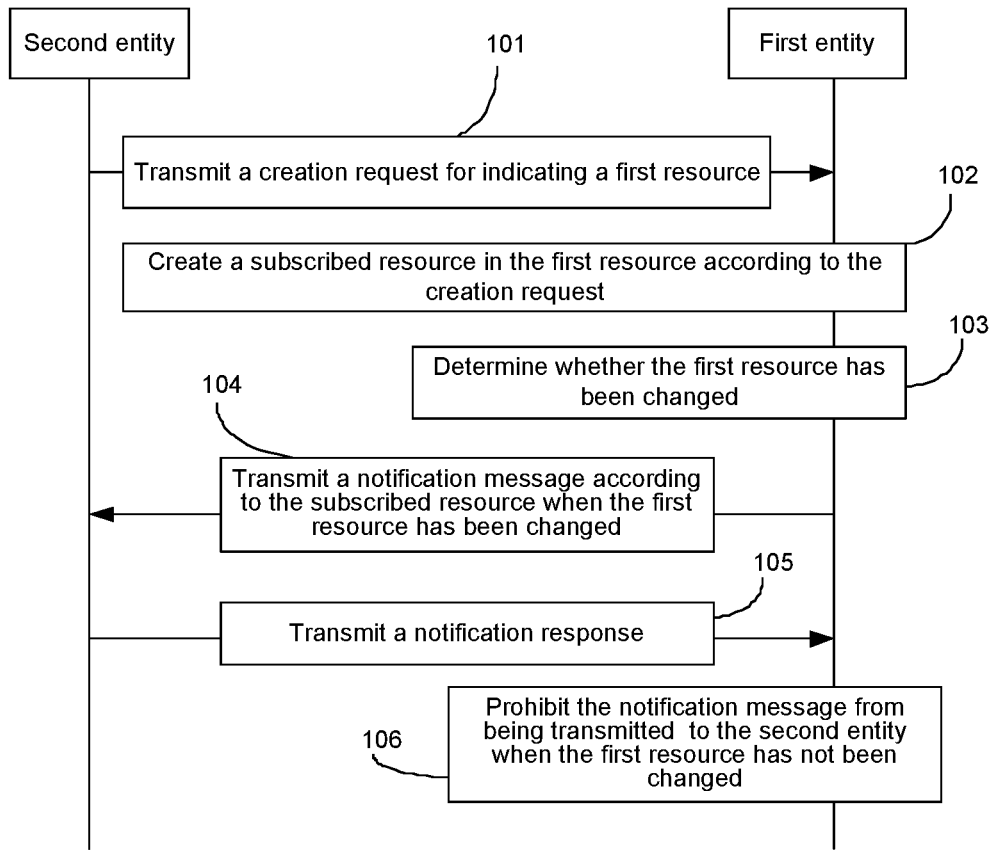
Figure 2:
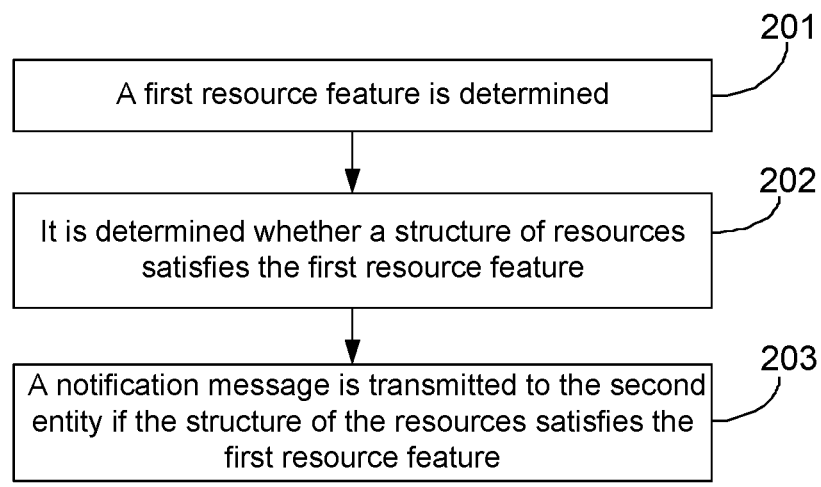

FIG. 1-2 is a flowchart of an information notification method in the related art. As shown in FIG. 1-2, the information notification method may comprise the following steps.

In step 101, a second entity transmits a creation request for indicating a first resource to a first entity.

The second entity may transmit the creation request for indicating the first resource to the first entity when the second entity needs to acquire a change condition of information on the first resource.

In step 102, the first entity creates a subscribed resource in the first resource according to the creation request.

After receiving the creation request, the first entity may directly create the subscribed resource in the first resource.

In step 103, the first entity determines whether the first resource has been changed. Step 104 is performed if the first resource has been changed; and step 106 is performed if the first resource has not been changed.

After the first entity creates the subscribed resource, the first entity may determine whether the first resource has been changed in real time. Step 104 is performed, that is, a notification message is directly transmitted to the second entity according to the subscribed resource, if the first resource has been changed. Step 106 is performed, that is, the notification message is prohibited from being transmitted to the second entity, if the first resource has not been changed.

In step 104, the first entity transmits a notification message to the second entity according to the subscribed resource.

In step 105, the second entity transmits a notification response to the first entity.

In step 106, the first entity is prohibited from transmitting the notification message to the second entity.

However, since the first entity may manage multiple resources in the related art, and there is often a large number of the multiple resources, if the second entity needs to acquire a change condition of information in each resource, the second entity needs to transmit a creation request to the first entity multiple times, and the first entity also needs to create multiple subscribed resources, which results in cumbersome information notification steps and inefficient information notification.

As shown in FIG. 2, the embodiments of the present application provide an information notification method, which may be used in the first entity A in FIG. 1. The information notification method may comprise the following steps.

In step 201, a first resource feature is determined.

In step 202, it is determined whether a structure of resources satisfies the first resource feature.

In step 203, a notification message is transmitted to the second entity if the structure of the resources satisfies the first resource feature.

In summary, in the information notification method according to the embodiments of the present application, before the first entity transmits the notification message to the second entity, the first entity only needs to determine whether the resources managed by itself satisfy the first resource feature, and therefore as long as the resources satisfy the first resource feature, the first entity transmits the notification message to the second entity without the second entity requesting the first entity to create multiple subscribed resources, thereby reducing a number of information notification steps and improving the efficiency of the subscription notification.

In an example, the first resource feature is at least one resource structure, and step 202 may comprise: determining whether the structure of the resources satisfies any of the at least one resource structure.

In an example, the first resource feature is at least one resource structure described by at least one semantic descriptor, and step 202 may comprise: determining whether the structure of the resources satisfies any of the at least one resource structure.

In an example, the first resource feature is at least one index, which points to at least one resource structure, and step 202 may comprise: determining whether the structure of the resources satisfies any of the at least one resource structure.

In an example, the first resource feature is at least one index, which points to at least one resource structure described by at least one resource descriptor, and step 202 may comprise: determining whether the structure of the resources satisfies any of the at least one resource structure.

In an example, before step 201, the information notification method may further comprise: creating a first subscribed resource which comprises information for indicating the first resource feature; and step 201 may comprise:

determining the first resource feature according to the first subscribed resource.

In an example, after the first subscribed resource is created, the information notification method may further comprise: setting an enabling attribute of the first subscribed resource to be true.

In an example, before step 202, the information notification method may further comprise:

receiving a resource operation request transmitted by a third entity, wherein the resource operation request comprises a resource acquisition request, a resource update request, a resource notification request, a resource discovery request, or a resource deletion request; or receiving a resource creation request transmitted by the third entity and creating resources.

In an example, before step 203, the information notification method may further comprise:

creating a second subscribed resource in the resources if the structure of the resources satisfies a reference resource feature; and step 203 may comprise: transmitting a notification message to the second entity according to the second subscribed resource.

In an example, after step 203, the information notification method may further comprise:

creating a second subscribed resource in the resources; and transmitting a notification message to the second entity according to the second subscribed resource when the resources are changed.

In an example, the structure of the resources comprises a resource relationship and a resource type.

In an example, before the first subscribed resource is created, the information notification method may further comprise:

receiving a creation request transmitted by the second entity; and creating a first subscribed resource comprises:

creating the first subscribed resource according to the creation request.

In summary, in the information notification method according to the embodiments of the present application, before the first entity transmits the notification message to the second entity, the first entity only needs to determine whether the resources managed by itself satisfy the first resource feature, and therefore as long as the resources satisfy the first resource feature, the first entity transmits the notification message to the second entity without the second entity requesting the first entity to create multiple subscribed resources, thereby reducing a number of information notification steps and improving the efficiency of the subscription notification.

Figure 3:
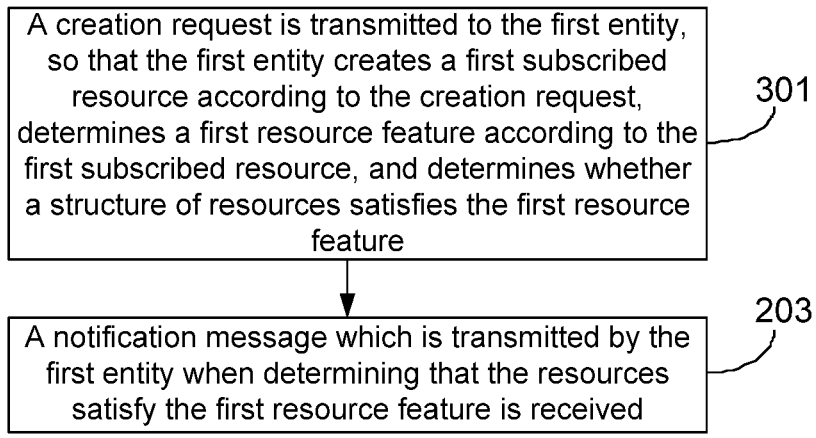
FIG. 3 is a flowchart of another information notification method according to an embodiment of the present application.

As shown in FIG. 3, the embodiments of the present application provide another information notification method, which may be used for the second entity B in FIG. 1. The information notification method may comprise the following steps.

In step 301, a creation request is transmitted to the first entity, so that the first entity creates a first subscribed resource according to the creation request, determines a first resource feature according to the first subscribed resource, and determines whether a structure of resources satisfies the first resource feature.

In step 302, a notification message which is transmitted by the first entity when determining that the resources satisfy the first resource feature is received.

In summary, in the information notification method according to the embodiments of the present application, the second entity transmits a creation request to the first entity in advance, so that the first entity creates a first subscribed resource, determines a first resource feature according to the first subscribed resource, determines whether resources satisfy the first resource feature, and transmits a notification message to the second entity when the resources satisfy the first resource feature. That is, in the embodiments of the present application, the second entity may trigger the first entity to transmit multiple notification messages about the resources to the second entity without requesting the first entity to create multiple subscribed resources, thereby reducing a number of information notification steps and improving the efficiency of the subscription notification.

Figure 4:
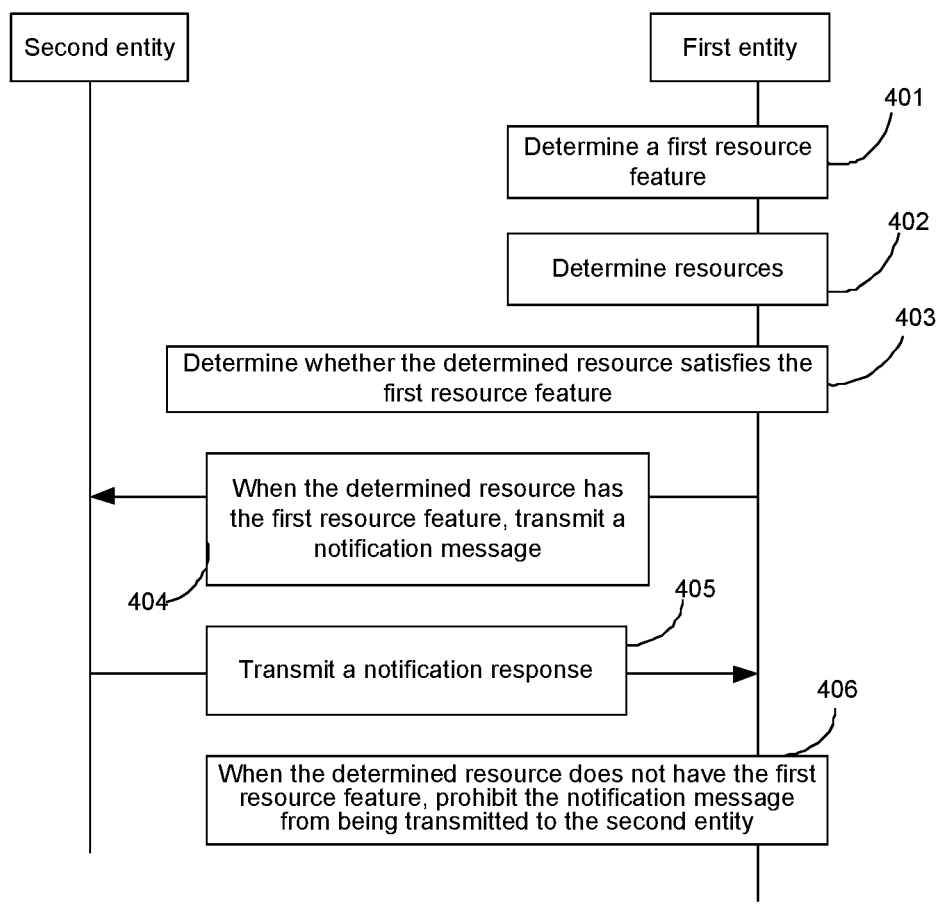
FIG. 4 is a flowchart of still another information notification method according to an embodiment of the present application.

FIG. 4 is a flowchart of still another information notification method according to an embodiment of the present application. The information notification method may be used for the information notification scenario shown in FIG. 1. As shown in FIG. 4, the information notification method may comprise the following steps.

In step 401, the first entity determines a first resource feature.

For example, the first entity determines the first resource feature in the following aspects.

Figure 5:
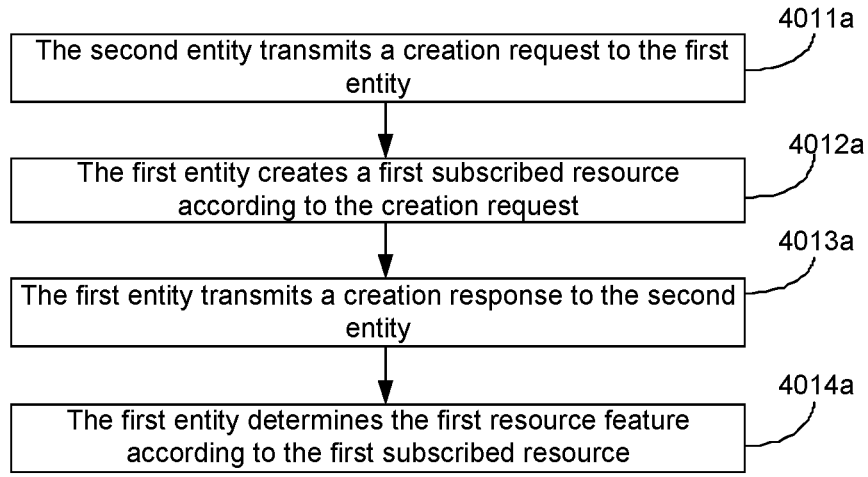
FIG. 5 is a flowchart of a method for determining a first resource feature according to an embodiment of the present application.

In a first aspect, FIG. 5 is a flowchart of a method for determining a first resource feature according to an embodiment of the present application. As shown in FIG. 5, step 401 may comprise the following steps.

In step 4011*a*, the second entity transmits a creation request to the first entity.

the second entity may generate a creation request for creating a first subscribed resource when the second entity needs to receive a notification message transmitted by the first entity, and transmit the generated creation request to the first entity.

It should be illustrated that the creation request may comprise two parts. On one hand, one part of the request may comprise an instruction for creating a subscribed resource, and the other part of the request may be empty; and on the other hand, one part of the request may comprise an instruction for creating a subscribed resource, and the other part of the request may comprise information for creating the subscribed resource, for example, information of the first resource feature. For example, the creation request may be used for creating a resource <structured Based Subscription>, i.e., creating a "structure-based resource."

In step 4012*a*, the first entity creates a first subscribed resource according to the creation request.

After the first entity receives the creation request, the first entity may create a first subscribed resource according to a pre-stored first resource feature if the creation request only comprises an instruction for creating a subscribed resource, wherein the first subscribed resource may comprise information for indicating the first resource feature. The first entity may directly create the first subscribed resource according to the information for indicating the first resource feature in the creation request if the creation request comprises not only the instruction for creating the subscribed resource, but also comprises the information for indicating the first resource feature, so that the created first subscribed resource comprises the information for indicating the first resource feature.

Specifically, the information contained in the first subscribed resource may be information contained in the first subscribed resource in the following implementations.

In a first implementation, the first resource feature may comprise at least one resource structure, and the information for indicating the first resource feature in the first subscribed resource may be a list of structures comprising at least one resource structure. For example, the list of structures may be as shown in Table 1. The list of structures may comprise a resource structure 1, a resource structure 2, and a resource structure 3, that is, the information contained in the first subscribed resource is a list of structures.

TABLE 1

| |
| --- |
| Resource structure 1 |
| Resource structure 2 |
| Resource structure 3 |

In the first implementation, the first subscribed resource <structured Based Subscription> created by the first entity may comprise: <Subscription> (indicating that <structured Based Subscription> may be subscribed) and a list of structures, which comprises multiple <AE>/container>/<container> (a resource structure used to represent <AE>/container>/<container>).

In a second implementation, the first resource feature may comprise at least one resource structure described by at least one semantic descriptor, and each of the at least one semantic descriptor may be used to describe a resource feature. Information for indicating the first resource feature in the first subscribed resource may be a list of descriptors comprising the at least one semantic descriptor, and each of the at least one semantic descriptor may be used to describe a resource structure. For example, the list of descriptors may be as shown in Table 2. The list of descriptors may comprise a semantic descriptor 1 for describing the resource structure 1, a semantic descriptor 2 for describing the resource structure 2, and a semantic description 3 for describing the resource structure 3, that is, the information contained in the first subscribed resource is a list of descriptors.

TABLE 2

| Semantic descriptor 1 |
| Semantic descriptor 2 |
| Semantic descriptor 3 |

In the second implementation, the first subscribed resource <Structured Based Subscription> may comprise: <Subscription> and a list of descriptors, and the list of descriptors may comprise multiple <AE>/<Semantic Descriptor> (a semantic description of which a framework may be a Resource Description Framework (RDF)).

In a third implementation, the first resource feature may comprise at least one index, which points to at least one resource structure, and the information for indicating the first resource feature in the first subscribed resource may be a list of indexes. The list of indexes comprises at least one index, which may be used to point to at least one resource structure, and the at least one resource structure may constitute a list of structures. For example, the list of indexes may be as shown in Table 3. The list of indexes may comprise an index 1 for pointing to the resource structure 1, an index 2 for pointing to the resource structure 2, and an index 3 for pointing to the resource structure 3. The first subscribed resource may comprise the list of indexes. The resource structure 1, the resource structure 2, and the resource structure 3 may constitute the list of structures as shown in Table 1. That is, the information contained in the first subscribed resource is a list of indexes.

TABLE 3

| Index 1 |
| Index 2 |
| Index 3 |

In the third implementation, the first subscribed resource <Structured Based Subscription> may comprise: <Subscription> and a list of indexes, wherein the list of indexes may comprise multiple subscribed resource indexes (or Subscribed Resource Refs), which are used to point to multiple resource structures, and the resource structures to which the multiple subscribed resource indexes point may be <AE1>/<container>.

In a fourth implementation, the first resource feature may comprise at least one resource structure described by at least one semantic descriptor to which at least one index points, wherein each of the at least one index may be used to point to a semantic descriptor, and each of the at least one semantic descriptor may be used to describe a resource feature. The information for pointing to the first resource feature in the first subscribed resource may be a list of indexes, which may comprise the at least one index. For example, the list of indexes may be as shown in Table 4. The list of indexes may comprise an index 4 for pointing to the semantic descriptor 1, an index 5 for pointing to the semantic descriptor 2, and an index 6 for pointing to the semantic descriptor 3. The first subscribed resource may comprise the list of indexes. The semantic descriptor 1, the semantic descriptor 2, and the semantic descriptor 3 may constitute the list of descriptors as shown in Table 2. That is, the information contained in the first subscribed resource is a list of indexes.

TABLE 4

| Index 5 |
| Index 6 |
| Index 7 |

In the fourth implementation, the first subscribed resource <Structured Based Subscription> may comprise: <Subscription> and a list of indexes, wherein the list of indexes may comprise multiple subscribed resource indexes (or Subscribed Resource Refs) for pointing to multiple semantic descriptors.

It should be illustrated that the structure of the resources in the embodiments of the present application comprises a resource relationship and a resource type, and the resource relationship is used to represent a connection relationship among various types of resources in the resources.

In step 4013a, the first entity transmits a creation response to the second entity.

For example, after the first entity creates the first subscribed resource, the first entity may further transmit, to the second entity, a creation response for indicating that the first subscribed resource has been created, so that, after receiving the creation response, the second entity may determine that the first entity has created the first subscribed resource.

In step 4014a, the first entity determines the first resource feature according to the first subscribed resource.

After the first entity creates the first subscribed resource, the first entity may determine the first resource feature according to the first subscribed resource. That is, the first entity determines a resource structure and a resource type in the first resource feature.

It should be illustrated that, in each of the four implementations described in step 4012a, the first subscribed resource comprises one type of information, which may be used to indicate at least one resource structure. In practical applications, the first subscribed resource may further comprise at least two types of information among four types of information (comprising information contained in the first subscribed resource in all the four implementations described above), and one type of information may be selected from the two types of information using a preset rule, and a first resource feature indicated by the information is used as the first resource feature obtained in step 4014a when the first resource feature is determined in step 4014a.

Figure 6:
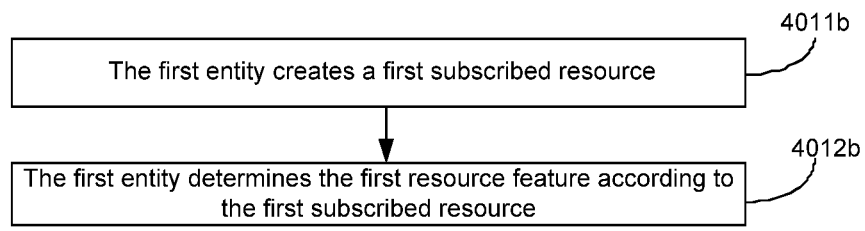
FIG. 6 is a flowchart of another method for determining a first resource feature according to an embodiment of the present application.

In a second aspect, FIG. 6 is a flowchart of another method for determining a first resource feature according to an embodiment of the present application. As shown in FIG. 6, step 401 may comprise the following steps.

In step 4011b, the first entity creates a first subscribed resource.

For example, in the method shown in FIG. 6, the second entity may not transmit a creation request to the first entity, and the first resource feature may be pre-stored on the first entity. The first entity may create the first subscribed resource under trigger of an operation of a user of the first entity, and the first subscribed resource may comprise information for indicating the first resource feature.

It should be illustrated that the information contained in the first subscribed resource created by the first entity in step 4011b may be known with reference to the specific description of the information contained in the first subscribed resource in step 4012a, and will not be described in detail here in the embodiments of the present application.

In step 4012b, the first entity determines the first resource feature according to the first subscribed resource.

After creating the first subscribed resource, the first entity may directly determine the first resource feature according to the first subscribed resource. Alternatively, before creating the first subscribed resource, the first entity may determine the first resource feature according to the pre-stored first resource feature.

In step 402, the first entity determines resources.

For example, the first entity may determine the resources in the following aspects.

Figure 7:
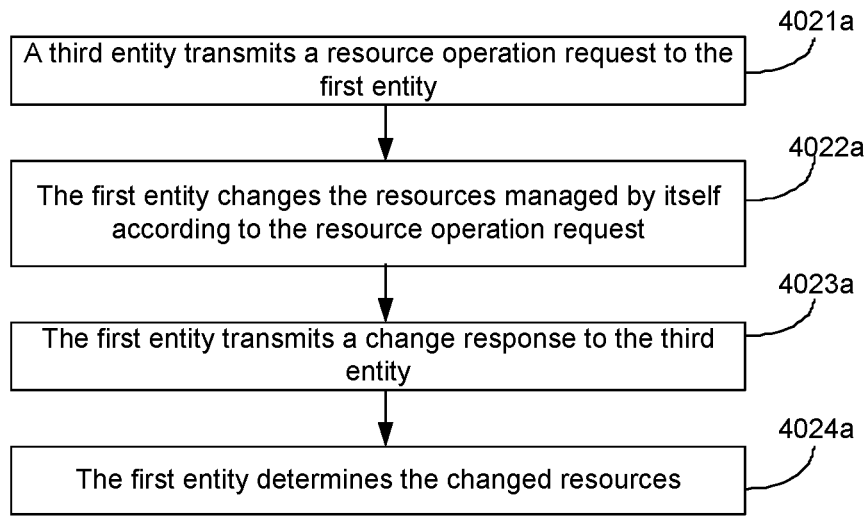
FIG. 7 is a flowchart of a method for determining resources according to an embodiment of the present application.

In a first aspect, FIG. 7 is a flowchart of a method for determining resources according to an embodiment of the present application. As shown in FIG. 7, step 402 may comprise the following steps.

In step 4021a, a third entity transmits a resource operation request to the first entity.

For example, the third entity may be the third entity C in the scenario diagram shown in FIG. 1. The third entity may generate a resource operation request and transmit the generated resource operation request to the first entity, when the third entity needs to control the resources managed by the first entity to be changed. Specifically, the resource operation request may be a resource acquisition request, a resource update request, a resource notification request, a resource discovery request, or a resource deletion request.

In step 4022a, the first entity changes the resources managed by itself according to the resource operation request.

After receiving the resource operation request, the first entity may change the resources managed by itself according to the resource operation request, for example, transmit information contained in a certain resource managed by itself to the third entity according to the resource operation request, or update information contained in a certain resource managed by itself according to the resource operation request, or delete a certain resource managed by itself and information contained in the resource according to the resource operation request.

In step 4023a, the first entity transmits a change response to the third entity.

After the first entity changes the resources corresponding to the resource operation request transmitted by the third entity according to the resource operation request, the first entity may transmit a change response for indicating that the change is completed to the third entity, so that the third entity may determine that the first entity has changed the resources according to the resource operation request after receiving the change response.

In step 4024a, the first entity determines the changed resources.

In the embodiment shown in FIG. 7, after the first entity changes the resources, the first entity may determine the changed resources.

Further, the embodiments shown in FIG. 7 may not comprise step 4021a and step 4023a, and in step 4022a, the first entity may directly change the resources managed by itself according to the operation of the user of the first entity, which is not limited in the embodiments of the present application.

It should be illustrated that, in step 4021a, the third entity may further transmit a resource creation request to the first entity, in step 4022a, the first entity may create resources in the resources managed by itself according to the resource creation request, in step 4023a, the first entity transmits a creation response to the third entity, and in 4024a, the first entity may determine the created resources.

Figure 8:
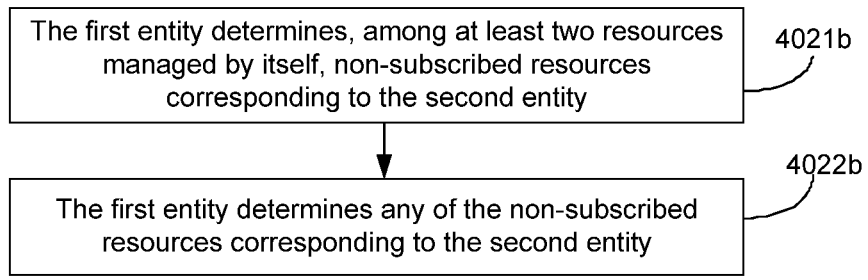
FIG. 8 is a flowchart of another method for determining resources according to an embodiment of the present application.

In a second aspect, FIG. 8 is a flowchart of another method for determining resources according to an embodiment of the present application. As shown in FIG. 8, step 402 may comprise the following steps.

In step 4021b, the first entity determines, among at least two resources managed by itself, non-subscribed resources corresponding to the second entity.

In the embodiment shown in FIG. 8, after the first entity determines the first resource feature, the first entity may directly search at least two resources managed by itself for resources which have been subscribed by the second entity, so as to determine, among the at least two resources managed by itself, resources which have not been subscribed by the second entity, and determine the resources which have not been subscribed by the second entity as the non-subscribed resources corresponding to the second entity.

In step 4022b, the first entity determines any of the non-subscribed resources corresponding to the second entity.

After determining the non-subscribed resources corresponding to the second entity, the first entity may directly determine any of the non-subscribed resources corresponding to the second entity.

In an example, when the resource feature is a resource structure, in step 4022b, the first entity may further directly determine, among the non-subscribed resources corresponding to the second entity, a resource having a level less than or equal to that of the resource structure recorded in the first subscribed resource. Alternatively, in step 4022b, the first entity may further directly determine, among the non-subscribed resources corresponding to the second entity, a resource having a level equal to that of the resource structure recorded in the first subscribed resource.

Figure 9:
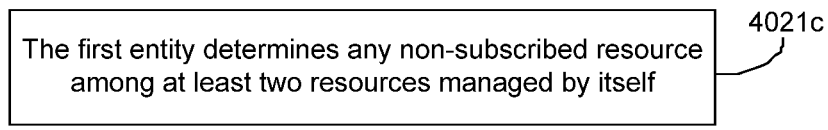
FIG. 9 is a flowchart of still another method for determining resources according to an embodiment of the present application.

In a third aspect, FIG. 9 is a flowchart of still another method for determining resources according to an embodiment of the present application. As shown in FIG. 9, step 402 may comprise the following steps.

In step 4021c, the first entity determines any non-subscribed resource among at least two resources managed by itself.

In step 4021c, after the first entity determines the first resource feature, the first entity may directly determine any non-subscribed resource among the at least two resources managed by itself.

In an example, when the resource feature is a resource structure, in step 4021c, the first entity may further directly determine, among the at least two resources managed by itself, a resource having a level less than or equal to that of the resource structure recorded in the first subscribed resource. Alternatively, in step 4021c, the first entity may further directly determine, among the at least two resources managed by itself, a resource having a level equal to that of the resource structure recorded in the first subscribed resource.

In step 403, the first entity determines whether the determined resource satisfies the first resource feature. Step 404 is performed if the determined resource satisfies the first resource feature; and step 406 is performed if the determined resource does not satisfy the first resource feature.

After determining the first resource feature and the resource, the first entity may determine whether the resource satisfies (that is, has) the first resource feature. For example, the first resource feature may be a resource structure, and the first entity may compare the structure of the determined resource with the resource structures indicated by the information in the first subscribed resource, to determine whether the structure of the determined resource belongs to the resource structures indicated by the information in the first subscribed resource, i.e., determining whether there is a resource structure existing in the resource structures indicated by the information in the first subscribed resource, which is the same as the structure of the determined resource.

The first entity may determine that the determined resource satisfies the first resource feature if there is a resource structure existing in the resource structures indicated by the information in the first subscribed resource, which is the same as the structure of the determined resource; and the first entity may determine that the determined resource does not satisfy the first resource feature if there is no resource structure existing in the resource structures indicated by the information in the first subscribed resource, which is the same as the structure of the determined resource.

In step 404, the first entity transmits a notification message to the second entity.

For example, the first entity may transmit the notification message to the second entity in the following aspects.

Figure 10:
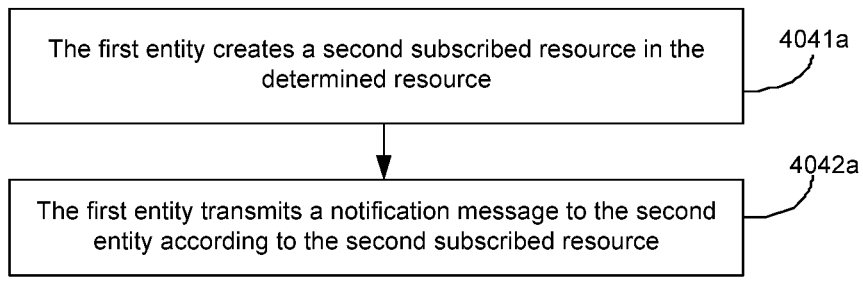
FIG. 10 is a flowchart of a method for transmitting a notification message according to an embodiment of the present application.

In a first aspect, FIG. 10 is a flowchart of a method for transmitting a notification message according to an embodiment of the present application. As shown in FIG. 10, step 404 may comprise the following steps.

In step 4041a, the first entity creates a second subscribed resource in the determined resource.

In the embodiment shown in FIG. 10, after determining that the determined resource has the first resource feature, the first entity may directly create a second subscribed resource in the determined resource, so as to facilitate subsequent monitoring of the change of the determined resource.

In step 4042a, the first entity transmits a notification message to the second entity according to the second subscribed resource.

After creating the second subscribed resource, the first entity may directly transmit a notification message to the second entity according to the second subscribed resource. For example, the notification message may be used to indicate information contained in the determined resource, or to indicate a change condition of the information contained in the determined resource.

It should be illustrated that, after step 4042a, the first entity may further monitor whether the determined resource has been changed in real time, and transmit a notification message to the second entity in real time when the determined resource has been changed. For example, the determined resource may be: <AE1>/container>/<container>, and the second subscribed resource created in the determined resource may be: <AE1>/container>/<container>/<subscription>. The first entity may transmit a notification message to the second entity according to the second subscribed resource when the determined resource has been changed.

Figure 11:
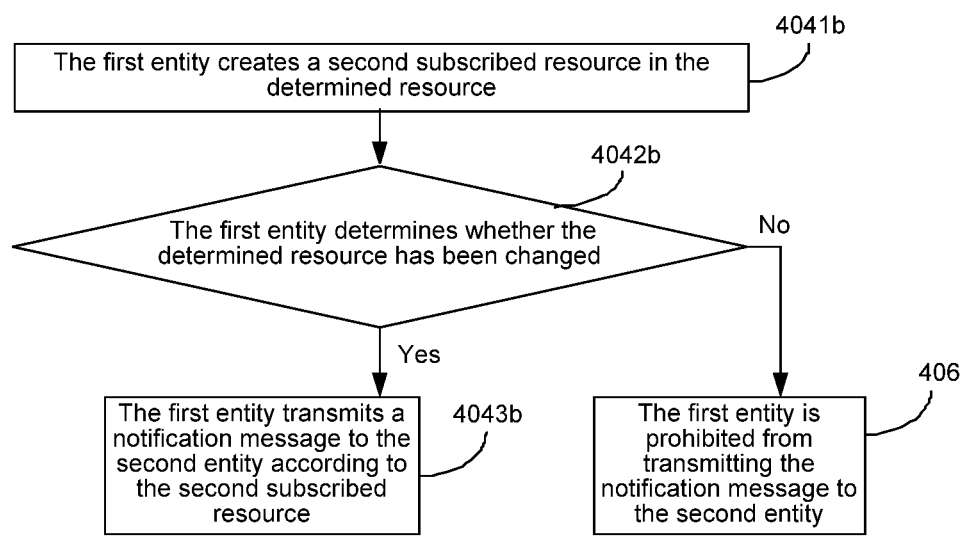
FIG. 11 is a flowchart of another method for transmitting a notification message according to an embodiment of the present application.

In a second aspect, FIG. 11 is a flowchart of another method for transmitting a notification message according to an embodiment of the present application. As shown in FIG. 11, step 404 may comprise the following steps.

In step 4041b, the first entity creates a second subscribed resource in the determined resource.

A specific step of the first entity creating a second subscribed resource in step 4041b may be known with reference to the specific step in step 4041a in the embodiment shown in FIG. 10, and will not be described in detail here in the embodiments of the present application.

In step 4042b, the first entity determines whether the determined resource has been changed. Step 4043b is performed if the determined resource has been changed; and Step 406 is performed if the determined resource has not been changed.

In step 4042b, the first entity needs to determine whether the determined resource has been changed within a time period in which a current time point is located. Step 4043b is performed if the determined resource has been changed.

In step 4043b, the first entity transmits a notification message to the second entity according to the second subscribed resource.

Specifically, the second subscribed resource may comprise information for indicating an address of the second entity, and the first entity may transmit a notification message to the second entity according to the second subscribed resource.

Figure 12:
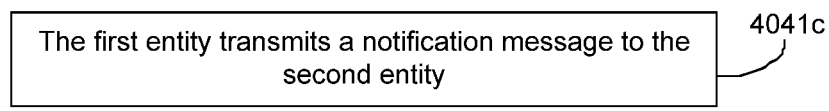
FIG. 12 is a flowchart of still another method for transmitting a notification message according to an embodiment of the present application.

In a third aspect, FIG. 12 is a flowchart of still another method for transmitting a notification message according to an embodiment of the present application. As shown in FIG. 12, step 404 may comprise the following steps.

In step 4041c, the first entity transmits a notification message to the second entity.

In the embodiment shown in FIG. 12, the first entity may neither need to create a second subscribed resource in the determined resource, nor need to determine whether the determined resource has been changed, and instead, the first entity directly transmits a notification message to the second entity after the determined resource has the first resource feature.

In step 405, the second entity transmits a notification response to the first entity.

After receiving the notification message, the second entity may transmit, to the first entity, a notification response for indicating that the notification message has been received, so that, after receiving the notification response, the first entity may know that the second entity has received the notification message transmitted by the first entity.

In step 406, the first entity is prohibited from transmitting the notification message to the second entity.

For example, the process of the first entity notifying the second entity of a change of information of one determined resource is merely briefly described in the embodiment shown in FIG. 4, and in practical applications, the second entity may be notified of changes of other resources, when a change condition of the determined resource is notified, or after the change condition of the determined resource has been notified, and a specific process of notifying the second entity of the changes of the other resources may be known with reference to the specific steps of notifying the change condition of the determined resource in the embodiment shown in FIG. 4.

It should be illustrated that, the first entity may further set an enabling attribute of the first subscribed resource to be true after the first subscribed resource is created in step 4012a or step 4011b if step 402 is implemented in the manner shown in FIG. 8 or FIG. 9. Therefore, in the manner shown in FIG. 8 or FIG. 9, the first entity may directly determine the resource when no resource operation request is received, and then transmit the notification message to the second entity in a step subsequent to step 402.

If the first entity transmits the notification message to the second entity in step 404 in the manner shown in FIG. 12, after step 404, the first entity may further create a second subscribed resource in the determined resource, and determine whether the determined resource has been changed in real time. The first entity transmits a notification message to the second entity again if the determined resource has been changed, and the first entity is prohibited from transmitting the notification message to the second entity if the determined resource has not been changed.

Further, in the information notification method shown in FIG. 4, the resource feature is taken as an example of the resource structure. In practical applications, the resource feature may also be other features, which is not limited in the embodiments of the present application.

In summary, in the information notification method according to the embodiments of the present application, before the first entity transmits the notification message to the second entity, the first entity only needs to determine whether the resources managed by itself satisfy the first resource feature, and therefore as long as the resources satisfy the first resource feature, the first entity transmits the notification message to the second entity without the second entity requesting the first entity to create multiple subscribed resources, thereby reducing a number of information notification steps and improving the efficiency of the subscription notification.

Figure 13:
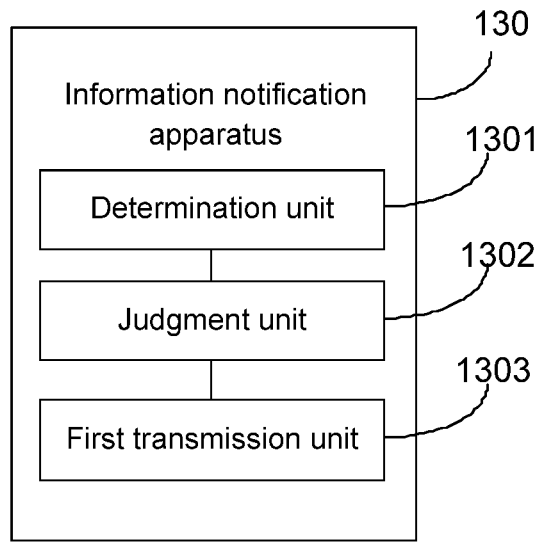
FIG. 13 is a schematic structural diagram of an information notification apparatus according to an embodiment of the present application.

As shown in FIG. 13, the embodiments of the present application provide an information notification apparatus 130, which may be used for the first entity shown in FIG. 1. The information notification apparatus 130 may comprise:

a determination unit 1301 configured to determine a first resource feature;

a judgment unit 1302 configured to determine whether a structure of resources satisfies the first resource feature;

a first transmission unit 1303 configured to transmit a notification message to the second entity when the structure of the resources satisfies the first resource feature.

In summary, in the information notification method according to the embodiments of the present application, before the first transmission unit in the first entity transmits the notification message to the second entity, the judgment unit only needs to determine whether the resources managed by the first entity satisfy the first resource feature, and therefore as long as the resources satisfy the first resource feature, the first transmission unit transmits the notification message to the second entity without the second entity requesting the first entity to create multiple subscribed resources, thereby reducing a number of information notification steps and improving the efficiency of the subscription notification.

In an example, the first resource feature is at least one resource structure, and the judgment unit 1302 is further configured to determine whether the structure of the resources satisfies any of the at least one resource structure.

In an example, the first resource feature is at least one resource structure described by at least one semantic descriptor, and the judgment unit 1302 is further configured to determine whether the structure of the resources satisfies any of the at least one resource structure.

In an example, the first resource feature is at least one index, which points to at least one resource structure, and the judgment unit 1302 is further configured to determine whether the structure of the resources satisfies any of the at least one resource structure.

In an example, the first resource feature is at least one index, which points to at least one resource structure described by at least one resource descriptor, and the judgment unit 1302 is further configured to determine whether the structure of the resources satisfies any of the at least one resource structure.

Figure 14:
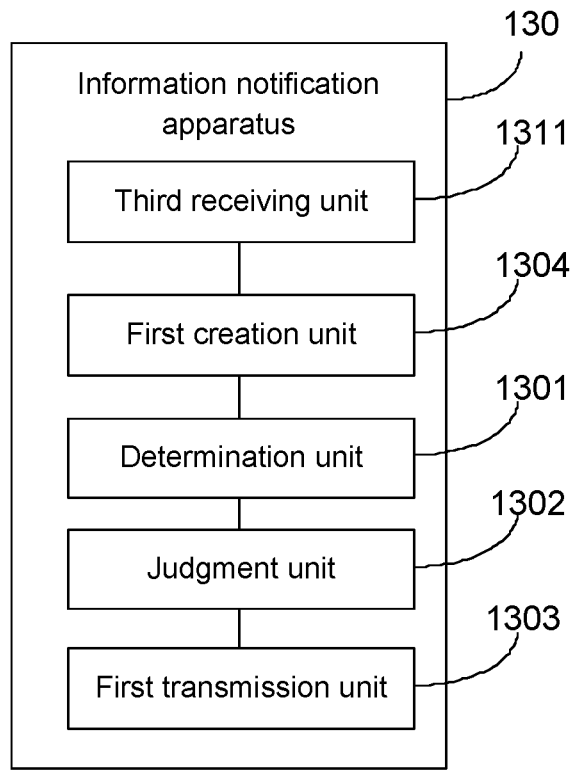
FIG. 14 is a schematic structural diagram of another information notification apparatus according to an embodiment of the present application.

In an example, FIG. 14 is a schematic structural diagram of another information notification apparatus according to an embodiment of the present application. As shown in FIG. 14, on the basis of FIG. 13, the information notification apparatus 130 may further comprise:

a first creation unit 1304 configured to create a first subscribed resource which comprises information for indicating the first resource feature; and the determination unit 1301 is further configured to determine the first resource feature according to the first subscribed resource.

Figure 15:
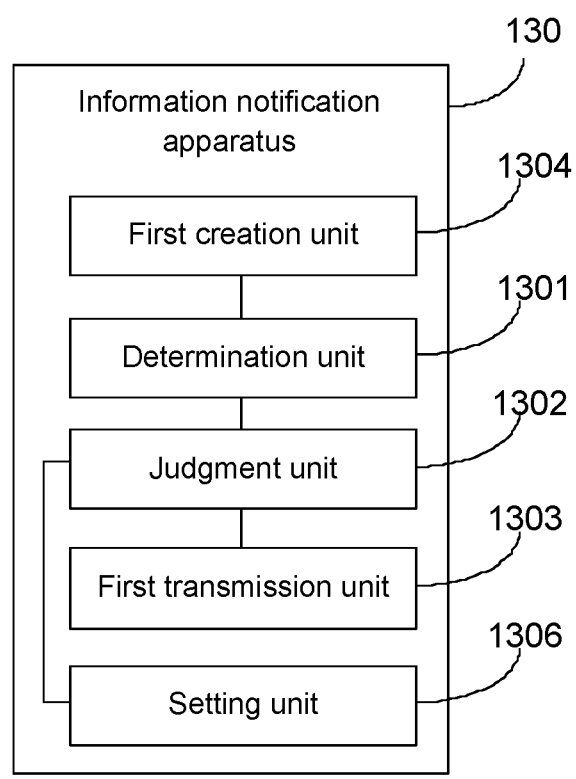
FIG. 15 is a schematic structural diagram of still another information notification apparatus according to an embodiment of the present application.

In an example, FIG. 15 is a schematic structural diagram of still another information notification apparatus according to an embodiment of the present application. As shown in FIG. 15, on the basis of FIG. 14, the information notification apparatus 130 may further comprise:

a setting unit 1305 configured to set an enabling attribute of the first subscribed resource to be true.

Figure 16:
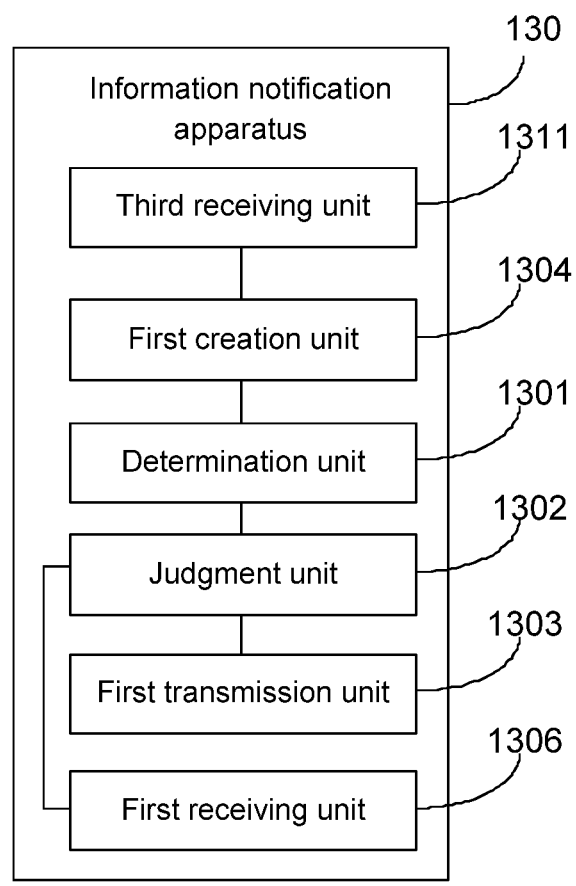
FIG. 16 is a schematic structural diagram of still another information notification apparatus according to an embodiment of the present application.
Figure 17:
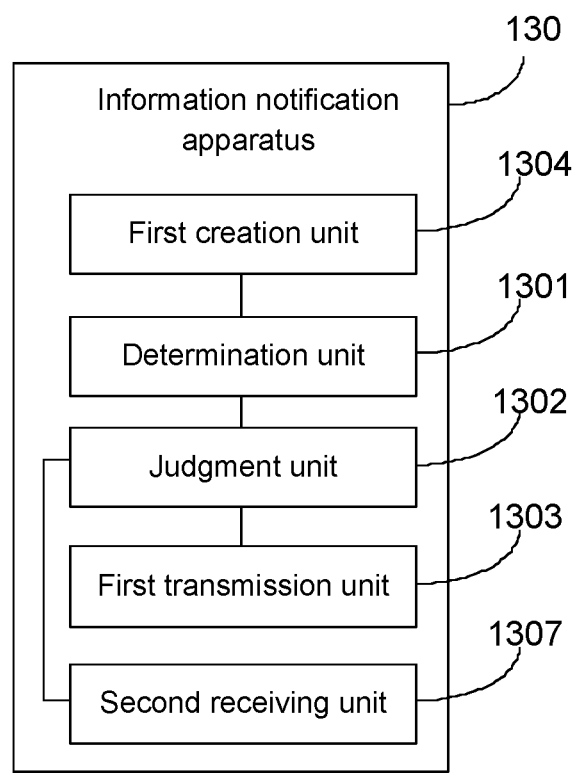
FIG. 17 is a schematic structural diagram of an information notification apparatus according to another embodiment of the present application.

In an example, FIG. 16 is a schematic structural diagram of still another information notification apparatus according to an embodiment of the present application. As shown in FIG. 16, on the basis of FIG. 14, the information notification apparatus 130 may further comprise:

a first receiving unit 1306 configured to receive a resource operation request transmitted by a third entity, wherein the resource operation request comprises a resource acquisition request, a resource update request, a resource notification request, a resource discovery request, or a resource deletion request; or FIG. 17 is a schematic structural diagram of an information notification apparatus according to another embodiment of the present application. As shown in FIG. 17, on the basis of FIG. 14, the information notification apparatus 130 may further comprise:

a second receiving unit 1307 configured to receive a resource creation request transmitted by the third entity and create resources.

Figure 18:
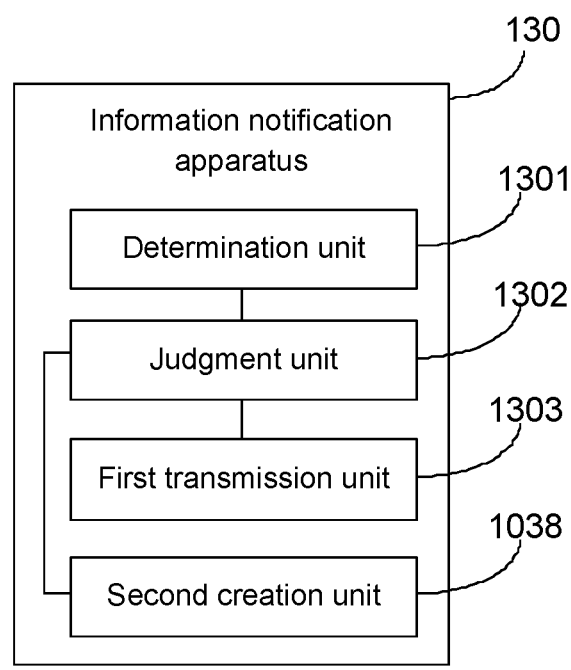
FIG. 18 is a schematic structural diagram of another information notification apparatus according to another embodiment of the present application.

In an example, FIG. 18 is a schematic structural diagram of another information notification apparatus according to another embodiment of the present application. As shown in FIG. 18, on the basis of FIG. 13, the information notification apparatus 130 may further comprise:

a second creation unit 1308 configured to create a second subscribed resource in the resources when the structure of the resources satisfies a reference resource feature; and the first transmission unit 1303 is further configured to transmit a notification message to the second entity according to the second subscribed resource.

Figure 19:
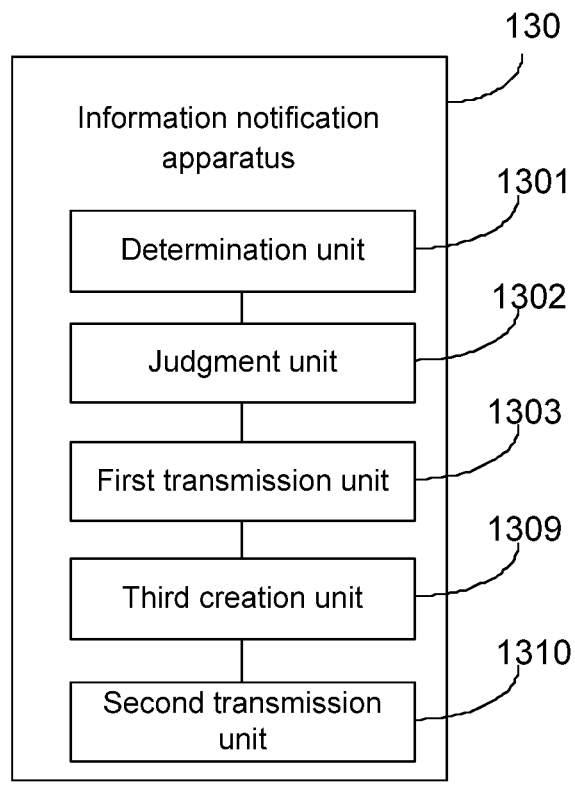
FIG. 19 is a schematic structural diagram of still another information notification apparatus according to another embodiment of the present application.

In an example, FIG. 19 is a schematic structural diagram of still another information notification apparatus according to another embodiment of the present application. As shown in FIG. 19, on the basis of FIG. 13, the information notification apparatus 130 may further comprise:

a third creation unit 1309 configured to create a second subscribed resource in the resources; and a second transmission unit 1310 configured to transmit a notification message to the second entity according to the second subscribed resource when the resources are changed.

In an example, the structure of the resources comprises a resource relationship and a resource type.

As shown in FIG. 14 or 16, the information notification apparatus 130 may further comprise:

a third receiving unit 1311 configured to receive a creation request transmitted by the second entity; and the first creation unit 1304 is further configured to create the first subscribed resource according to the creation request.

In summary, in the information notification apparatus according to the embodiments of the present application, before the first transmission unit in the first entity transmits the notification message to the second entity, the judgment unit only needs to determine whether the resources managed by the first entity satisfy the first resource feature, and therefore as long as the resources satisfy the first resource feature, the first transmission unit transmits the notification message to the second entity without the second entity requesting the first entity to create multiple subscribed resources, thereby reducing a number of information notification steps and improving the efficiency of the subscription notification.

Figure 20:
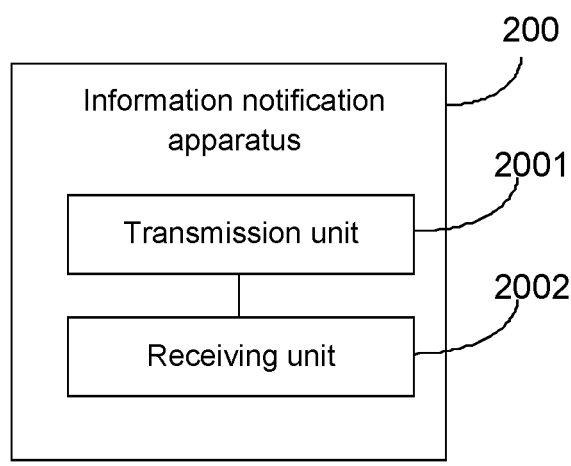
FIG. 20 is a schematic structural diagram of still another information notification apparatus according to another embodiment of the present application.

FIG. 20 is a schematic structural diagram of still another information notification apparatus 200 according to another embodiment of the present application, which may be used for the second entity shown in FIG. 1. As shown in FIG. 20, the information notification apparatus 200 may comprise:

a transmission unit 2001 configured to transmit a creation request to the first entity, so that the first entity creates a first subscribed resource according to the creation request, determines a first resource feature according to the first subscribed resource, and determines whether a structure of resources satisfies the first resource feature; and a receiving unit 2002 configured to receive a notification message which is transmitted by the first entity when determining that the resources satisfy the first resource feature.

In summary, in the present embodiment, the transmission unit in the second entity transmits a creation request to the first entity in advance, so that the first entity creates a first subscribed resource, determines a first resource feature according to the first subscribed resource, determines whether resources satisfy the first resource feature, and transmits a notification message to the second entity when the resources satisfy the first resource feature. That is, in the embodiments of the present application, the second entity may trigger the first entity to transmit multiple notification messages about the resources to the second entity without requesting the first entity to create multiple subscribed resources, thereby reducing a number of information notification steps and improving the efficiency of the subscription notification.

The embodiments of the present application provide an information notification system, which may comprise the first entity A, the second entity B, and the third entity C as shown in FIG. 1, wherein the first entity may comprise the information notification apparatus shown in any of FIGS. 13 to 19, and the second entity may comprise the information notification apparatus shown in FIG. 20.

In an example, the first entity may be a CSE, the second entity may be an AE or a CSE, and the third entity may be an AE or a CSE. For example, the first entity may be an Internet of Things management device, which may comprise a CSE, the second entity may be a mobile phone, which comprises an AE or a CSE, and the third entity may be a smart home device, which comprises an AE or a CSE.

In summary, in the information notification system according to the embodiments of the present application, before the first entity transmits the notification message to the second entity, the first entity only needs to determine whether the resources managed by the first entity satisfy the first resource feature, and therefore as long as the resources satisfy the first resource feature, the first entity transmits the notification message to the second entity without the second entity requesting the first entity to create multiple subscribed resources, thereby reducing a number of information notification steps and improving the efficiency of the subscription notification.

All entities (comprising an AE, a CSE, data, etc.) according to the embodiments of the present application are represented by resources. Each of the resources may be uniquely identified, and comprises an attribute and a child resource, wherein the attribute is used to store resource-related information, and the child resource is a lower-level resource of the resource. The resource comprises an index pointing to the child resource.

The present disclosure supports the following two definitions of a resource structure:

First definition of the resource structure: The resource structure refers to a tree-shaped structure composed of resources according to a certain logical relationship. For a certain resource, an upper-level resource is a parent resource, and a lower-level resource is a child resource. For a root resource, it does not have a parent resource but only has a child-resource. The resource and the child resource constitute a two-level resource structure, and the parent resource, the resource, and the child resource constitute a three-level resource structure. The resource structures are the same when resource structures have the same tree-shaped structure. For example, The two resource structures are the same when each of two resource structures comprises a root resource, a resource, and a child resource.

Second definition of the resource structure: The resource structure refers to a tree-shaped structure composed of various types of resources according to a certain logical relationship. For a certain resource, an upper-level resource is a parent resource, and a lower-level resource is a child resource. For a root resource, it does not have a parent resource but only has a child-resource. The resource and the child resource constitute a two-level resource structure, and the parent resource, the resource, and the child resource constitute a three-level resource structure. the resource structures are the same when resource structures have the same tree-shaped structure and resources in each layer have the same type. For example, a resource (type B), and a child resource (type C), the two resource structures are the same when each of two resource structures comprise a root resource (type A).

It should be illustrated that the embodiments of the information notification method, the embodiments of the information notification apparatus, and the embodiments of the information notification system according to the embodiments of the present application may refer to each other, and will not be described in detail here in the embodiments of the present application.

The above description is merely optional embodiments of the present application, and is not intended to limit the present application. Any modifications, equivalent substitutions, improvements, etc. made within the spirit and principles of the present application shall fall within the protection scope of the present application.

I claim:

1. An information notification method performed by a first entity, the method comprising:
receiving a creation request which comprises information for indicating a first resource feature from a second entity;
determining the first resource feature, wherein the first resource feature comprises a resource relationship and a resource type, and wherein the resource relationship is used to represent a connection relationship between resources and other various resources, and the resource type is used to represent a type of the resources and the other various resources;

receiving a resource operation request or a resource creation request transmitted by a third entity;

determining the resources in response to receiving the resource operation request or the resource creation request transmitted by the third entity;

determining whether a structure of the resources satisfies the resource relationship and the resource type; and transmitting a notification message to the second entity if the structure of the resources satisfies the resource relationship and the resource type, wherein before transmitting the notification message to the second entity, the method further comprises:

creating a second subscribed resource in the resources if the structure of the resources satisfies a reference resource feature; and transmitting the notification message to the second entity comprises: transmitting the notification message to the second entity according to the second subscribed resource.

2. The method according to claim 1, wherein the first resource feature is one or more resource structures.

3. The method according to claim 1, wherein the first resource feature is one or more resource structures, and determining whether a structure of resources satisfies the resource relationship and the resource type comprises:

determining whether the structure of the resources satisfies any of the one or more resource structures.

4. The method according to claim 1, wherein the first resource feature is one or more resource structures described by at least one semantic descriptor, and determining whether a structure of resources satisfies the resource relationship and the resource type comprises:

determining whether the structure of the resources satisfies any of the one or more resource structures.

5. The method according to claim 1, wherein the first resource feature is at least one index which points to one or more resource structures, and determining whether a structure of resources satisfies the resource relationship and the resource type comprises:

determining whether the structure of the resources satisfies any of the one or more resource structures.

6. The method according to claim 1, wherein the first resource feature is at least one index, which points to one or more resource structures described by at least one resource descriptor, and determining whether a structure of resources satisfies the first resource feature comprises:

determining whether the structure of the resources satisfies any of the one or more resource structures.

7. The method according to claim 1, wherein before determining the first resource feature, the method further comprises:

creating a first subscribed resource which comprises the information for indicating the first resource feature; and determining a first resource feature comprises:

determining the first resource feature according to the first subscribed resource.

8. The method according to claim 7, wherein after creating the first subscribed resource, the method further comprises:

setting an enabling attribute of the first subscribed resource to be true.

9. The method according to claim 7, wherein the resource operation request comprises a resource acquisition request, a resource update request, a resource notification request, a resource discovery request, or a resource deletion request.

10. The method according to claim 1, wherein after transmitting the notification message to the second entity, the method further comprises:

creating a second subscribed resource in the resources; and transmitting a notification message to the second entity according to the second subscribed resource when the resources are changed.

11. The method according to claim 7, wherein creating the first subscribed resource comprises:

creating the first subscribed resource according to the creation request.

12. The method according to claim 9, wherein creating the first subscribed resource comprises:

creating the first subscribed resource according to the creation request.

13. An information notification device for a first entity, the information notification device comprising:

a processor;

a memory, configured to be coupled to the processor and to store instructions that, when executed on the processor, cause the processor to be configured to:

receive a creation request which comprises information for indicating a first resource feature from a second entity;

determine the first resource feature, wherein the first resource feature comprises a resource relationship and a resource type, and wherein the resource relationship is used to represent a connection relationship between resources and other various resources, and the resource type is used to represent a type of the resources and the other various resources;

receive a resource operation request or a resource creation request transmitted by a third entity;

determine the resources in response to receiving the resource operation request or the resource creation request transmitted by the third entity;

determine whether a structure of the resources satisfies the resource relationship and the resource type; and transmit a notification message to the second entity when the structure of the resources satisfies the resource relationship and the resource type, wherein before transmit the notification message to the second entity, the processor is further configured to:

create a second subscribed resource in the resources if the structure of the resources satisfies a reference resource feature; and transmit the notification message to the second entity comprises: transmitting the notification message to the second entity according to the second subscribed resource.

* * * * *